INVENTOR.
WILLIAM C. ALTEMUS
BY
Robert D. Sanborn
ATTORNEY

SIGNAL CONTRAST ENHANCEMENT CIRCUIT

Filed April 28, 1959 3 Sheets-Sheet 2

INVENTOR.
WILLIAM C. ALTEMUS
BY
Robert D. Sanborn
ATTORNEY

SIGNAL CONTRAST ENHANCEMENT CIRCUIT

Filed April 28, 1959 3 Sheets-Sheet 3

INVENTOR.
WILLIAM C. ALTEMUS
BY
Robert D. Sanborn
ATTORNEY 3,205,446

SIGNAL CONTRAST ENHANCEMENT CIRCUIT

William C. Altemus, Oreland, Pa., assignor, by mesne assignments, to Philco Corporation, Philadelphia, Pa., a corporation of Delaware Filed Apr. 28, 1959, Ser. No. 809,536
9 Claims. (Cl. 328—169)

This invention relates to signal processing systems and more particularly to systems for differentially amplifying selected amplitude ranges of an electrical signal.

Systems similar to closed circuit television systems have been proposed for viewing objects such as photographic negatives and for increasing the contrast between areas of different apparent brightness on the viewed object. This can be accomplished by scanning the object to be viewed in a predetermined pattern to develop a time varying signal the instantaneous amplitude of which is indicative of the apparent brightness of the incremental area then being scanned. The contrast between areas of different apparent brightness is enhanced by amplifying the video signal thereby to increase the absolute differences between time spaced portions of the signal. Since indicators for displaying variable amplitude electrical signals as variable intensity luminous signals have limited dynamic range, it is usually not practical to amplify the entire amplitude range of the video signal. It then becomes necessary to provide some means for selecting the particular amplitude range that will be amplified.

The copending application of Joseph F. Fisher, Serial No. 690,150, filed October 14, 1957, now U.S. Patent 2,999,127, discloses and claims one system for selecting a particular amplitude range of an electrical signal for selective amplification. In the system shown in this copending application two clipping circuits are independently adjusted to select respectively the upper and lower limits of the selected amplitude range. A separate gain control is provided for expanding the selected amplitude range to a predetermined dynamic range at the output of the system which is generally chosen to be the optimum dynamic range for a cathode ray tube indicator or similar display device.

It is an object of the present invention to provide an improved and simplified circuit for selecting for processing a particular amplitude range of a time varying signal.

Another object of the present invention is to provide a circuit having an adjustable gain controlling means and a co-ordinated input signal amplitude limiting means, said circuit being so arranged that the maximum dynamic output signal amplitude range of said system is substantially independent of the gain of said circuit.

It is a further object of the present invention to provide a system for amplifying a selected range of amplitude variations of an input signal in which the upper and lower limits of the selected amplitude range and the gain of the system are concurrently adjustable by means of a single control.

Still another object of the invention is to provide in an object viewing system a single control means for determining the degree of contrast enhancement and a second control means for selecting the particular amplitude range at which contrast enhancement occurs.

These and other objects of the invention are accomplished by providing two clipping circuits and a variable gain circuit in series. The circuit is arranged to pass only those variations in signal amplitude which lie between the clipping levels of the two clipper circuits. The two clipper circuits and the variable gain circuit are all responsive to a single control. In a preferred embodiment of the invention adjustment of the control in one direction will cause the upper clipping level to increase, the lower clipping level to decrease, and the gain of the system to decrease thereby to keep the dynamic range of the output signal substantially constant. Means may also be provided for changing the absolute level of the input signal with respect to said two clipping levels thereby to select the portion of the input signal which is selectively amplified without affecting the amplitude range over which selective amplification occurs.

For a better understanding of the present invention together with other and further objects thereof reference should now be made to the following detailed description which is to be read in conjunction with the accompanying drawings in which.

Figures 1, 3A, 3B, 5:
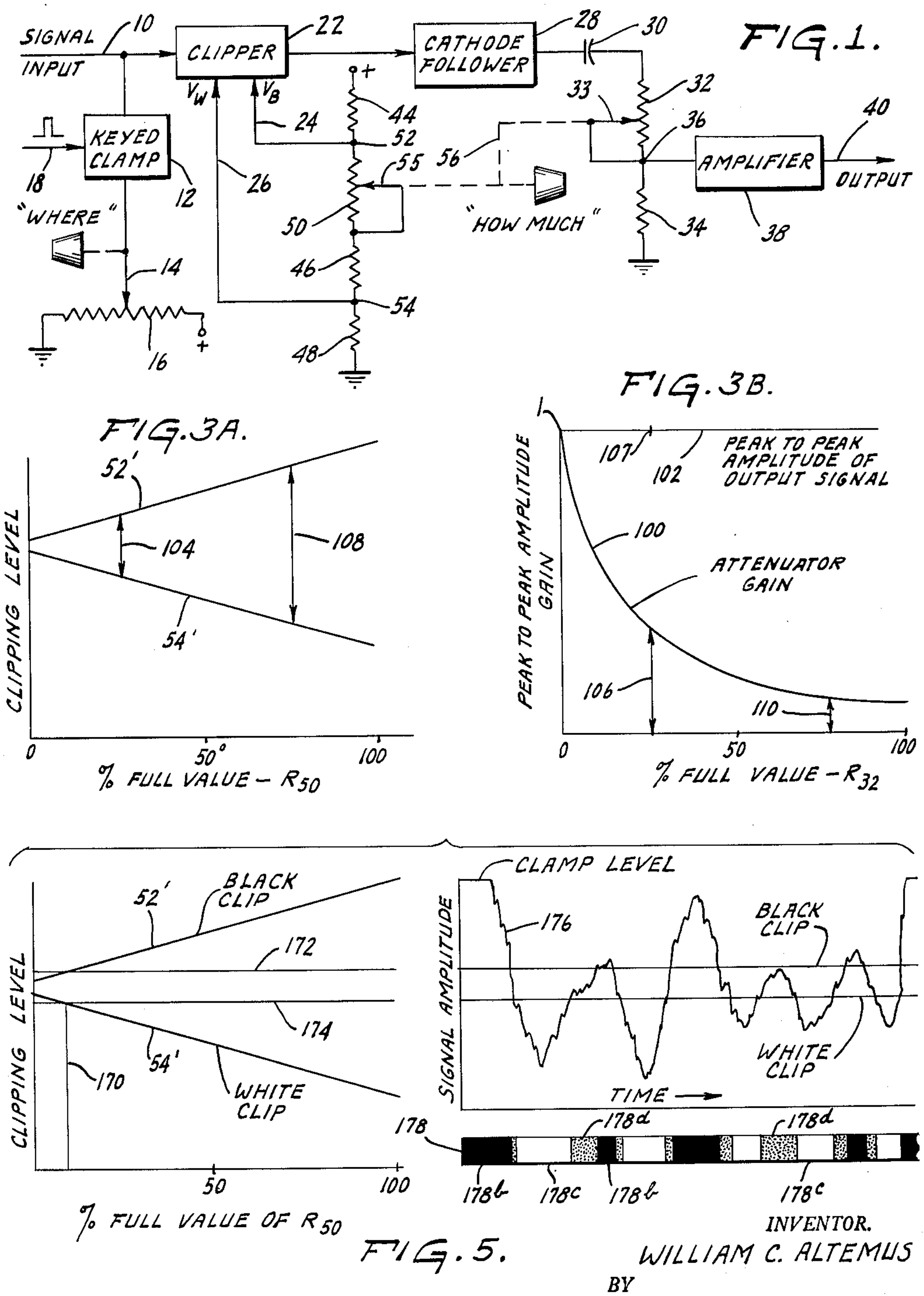
FIG. 1 is a block diagram of one preferred embodiment of the invention.
FIGS. 3A and 3B are a series of characteristic curves which define the operating characteristics of selected portions of the system of FIGS. 1 and 2.
FIG. 5 is a second series of waveforms which further illustrates the operation of the circuit of FIGS. 1 and 2.

In the system shown in FIG. 1 a signal to be processed is supplied at input lead 10. This signal may be any time varying electrical signal but for the sake of simplifying the description of the operation of the system it will be assumed that it is a video signal such as might be employed in a television system. It will be assumed further that the most positive portion of the signal supplied at input 10 represents the black level on the cathode ray tube system which is employed as an indicator and that the less positive portions of the input signal represent the gray and white levels on the indicator. A keyed clamp circuit 12 is provided for setting the black level of the signal supplied at input 10 to a predetermined value which is determined by the position of tap 14 on potentiometer 16. Potentiometer 16 is connected between a source of positive potential represented by the plus sign and ground. Clamp circuit 12 is supplied with a gating signal by way of input lead 18 so that the clamp circuit 12 is active to clamp the input signal at the level set by tap 14 only at selected spaced times. The operative times for clamp 12 are selected with reference to the nature of the input signal present on lead 10. The clamped input signal on lead 10 is supplied to the input of a double clipper circuit 22. Two control inputs 24 and 26 supply clipper circuit 22 with signals which determine the upper or "black" clipping level and the lower or "white" clipping level, respectively. Only the amplitude variations lying between the level set by the signals on control inputs 24 and 26 are passed to cathode follower 28. The output of cathode follower 28 is connected to a gain control attenuator comprising a coupling capacitor 30, a variable resistor 32 and a fixed resistor 34, all connected in series between the output of cathode follower 28 and ground. The junction 36 of resistors 32 and 34 is connected to the input of an amplifier 38. The output lead 40 of amplifier 38 may be connected to the intensity control element of a suitable indicator such as a cathode ray tube indicator.

The clipping potentials present on control leads 24 and 26 are supplied by a potentiometer network comprising fixed resistors 44, 46 and 48 and variable resistor 50 all connected in series between a source of positive potential and ground. Fixed resistor 46 and variable resistor 50 may be combined if desired but are shown separately in FIG. 1 to indicate that in the preferred embodiment of the invention there is a certain minimum value of resistance for the combination of resistor 46 and variable resistor 50. The control input 24 is connected to the junction 52 between fixed resistor 44 and variable resistor 50. The control input 26 is connected to the junction 54 between fixed resistors 46 and 48. The tap 55 on variable resistor 50 is mechanically coupled to the movable tap 33 on variable resistor 32 in the gain control attenuator circuit. This mechanical coupling is schematically indicated by the broken line 56.

The schematic diagram of FIG. 2 will now be explained. Parts in FIG. 2 corresponding to like parts in FIG. 1 are identified by the same reference numeral. In the circuit shown in FIG. 2 the signal is supplied to input lead 10 from a cathode follower 62. A coupling capacitor 64 isolates input lead 10 from the direct current potentials present in cathode follower 62. The keyed clamp circuit 12 of FIG. 1 comprises a double diode 66 and resistors 68 and 70. The anode of one diode and the cathode of the other diode are connected directly to input leads 10. The other cathode and the other anode of double diode 66 are connected to tap 14 on the clamping level potentiometer 16 through resistors 68 and 70, respectively. Two input leads **18*a* and 18*b* are provided to the clamp circuit shown in FIG. 2. A source (not shown) supplies lead 18*a* with a positive pulse at a selected point in the input waveform and at the same time supplies a negative pulse to lead 18*b*. As is well known in the art, the action of clamp circuit 66 is to fix at the potential of tap 14 the particular portion of the input waveform which occurs at the time that the double diode is gated on by the signals supplied by way of leads 18*a* and 18*b*. Once the pulse signals terminate on leads 18*a* and 18*b* the potential of input lead 10 is free to vary from this set potential under the influence of the input signal supplied by cathode follower 62**.

Figure 2:
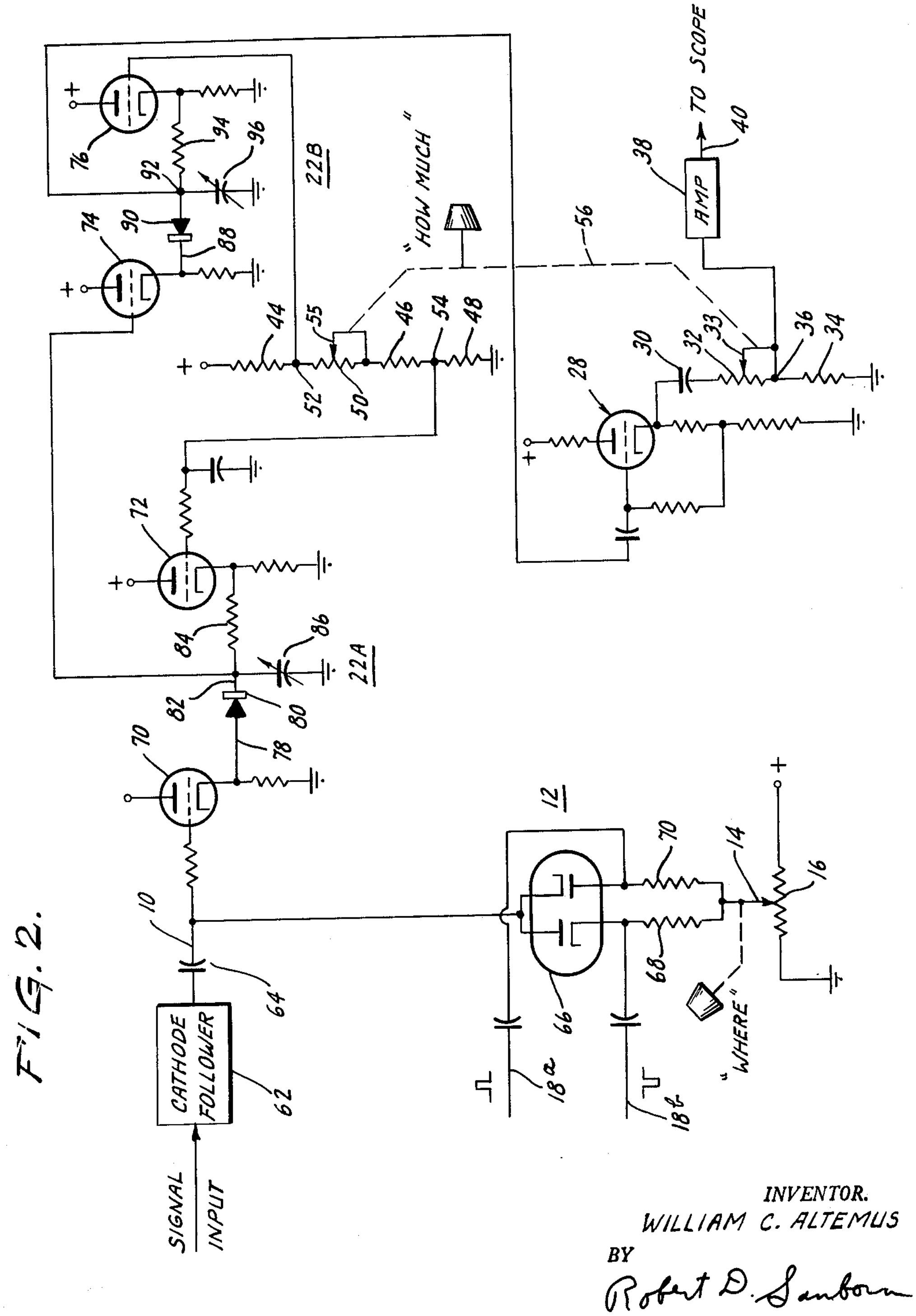
FIG. 2 is a schematic diagram of the system of FIG. 1.

The clipper circuit 22 of FIG. 1 is formed in FIG. 2 by the four cathode followers 70, 72, 74 and 76 and the circuits associated therewith. In FIG. 2 the reference numeral 22A designates the lower or white clipper circuit and numeral 22B designates the upper or black clipper circuit. Input connection 10 is connected to the control grid of cathode follower 70. The output of cathode follower 70 is connected to one terminal 78 of diode 80. The grid of cathode follower 72 is supplied with a D.C. potential from junction 54 on the clipping level potentiometer circuit. The output of cathode follower 72 is connected to terminal 82 through an isolating resistor 84. Thus cathode follower 72 provides a low impedance source of a variable bias potential for the cathode of diode 80. Capacitor 86 provides high frequency compensation for the shunt capacitance of diode 80. The terminal 82 of diode 80 is connected directly to the control grid of cathode follower 74. The output of cathode follower 74 is connected to the cathode terminal 88 of diode 90. Diode 90 may be similar to diode 80 but is connected in the circuit in the opposite polarity. Isolating resistor 94 connects the output of cathode follower 76 to the anode terminal 92 of diode 90. Again, cathode follower 76 comprises a low impedance source of variable bias potential for the anode terminal of diode 90. Capacitor 96 is again a high frequency compensating capacitor for the shunt capacitance of diode 90. The signal passed by diode 90 is supplied to the control grid of cathode follower 28. Cathode follower 28 is of conventional construction and requires no detailed explanation.

The circuit shown in FIGS. 1 and 2 operates in the following manner. The pulses supplied to diode 66 in keyed clamp circuit 12 by way of input leads **18*a* and 18*b* cause both halves of diodes 66 to conduct. As a result, input lead 10 will be clamped to the potential set by tap 14 on potentiometer 16. The clamping pulses may be supplied at any desired point in time but, in a system employing a television type scanning raster, the clamping pulses are preferably supplied during the retrace interval so that the black level signal which occurs during the retrace portion of the signal is clamped at the potential of tap 14**. As mentioned above, it will be assumed that black is represented by the most positive portion of the signal and less positive portions of the signal represent shades of gray and white.

The control grid of cathode follower 72 will be at a fixed positive potential which is determined by the setting of variable resistor 50. The cathode of cathode follower 72 is held at a slightly lower but directly corresponding positive potential by the well known cathode follower actions. For all values of input signal which place anode 78 of diode 82 at a potential higher than the bias potential supplied by cathode follower 72, diode 80 will conduct causing a corresponding signal to be developed across resistor 84. The signal appearing across resistor 84 and the bias signal supplied by cathode follower 72 together form the input signal to cathode follower 74. Therefore the clipper circuit 22A just described will pass all portions of the input signal which lie above the fixed bias potential set by cathode follower 72. If the anode terminal 78 of diode 80 is driven more negative than the bias supplied by cathode follower 72, the diode 80 becomes open circuited and no signal other than the bias supplied by cathode follower 72 is coupled to the input of cathode follower 74. This will occur on the white peaks of the signal.

Cathode follower 76 provides a fixed bias for the anode terminal 92 of diode 90. The value of this bias will depend upon the potential of terminal 52 on the potentiometer circuit. The bias potential supplied to the anode terminal 92 of diode 90 is higher than the potential supplied to the cathode terminal 82 of diode 80. Since diode 90 has its cathode terminal connected to the outputs of the cathode follower 74, it will pass only those portions of the signal which lie below the fixed bias potential of the anode 92. As a result, the net signal supplied to the input of cathode follower 28 is that amplitude range of the input signal which lies between the bias potentials supplied by cathode followers 72 and 76, respectively.

Turning now to the operation of the potentiometer circuit which sets the clipping levels, resistors 44 and 48 are preferably made equal to each other and much larger than variable resistor 50. For example, resistors 44 and 48 may have a value of 60,000 ohms while resistor 50 has a maximum value of 10,000 ohms. Resistor 46 may have a value of 1,000 ohms or less so that the total resistance between terminals 52 and 54 varies from something less than 1,000 ohms to a resistance between 10,000 and 11,000 ohms. It will be obvious to one skilled in the art that with resistor 50 set at its minimum value terminal 52 will have a potential only slightly greater than ½ the potential of the source which supplies the potentiometer circuit and terminal 54 will have a value only slightly less than half of this supply potential. As the value of resistor 50 is increased, more of the potential drop in the potentiometer circuit will occur across resistors 50 and 46 and less will occur across resistors 44 and 48. Therefore as resistor 50 is increased in value the potential at terminal 52 will become more positive as shown by line 52' in FIG. 3A and the potential of terminal 54 will become less positive as represented by line 54' in FIG. 3A. The bias potentials appearing at the cathodes of cathode followers 72 and 76 will have a variation which closely approximates curves 52' and 54' of FIG. 3A.

FIG. 3B illustrates the change in gain of the attenuator 32–34 as the value of resistor 32 is changed. This change in gain is represented by curve 100 of FIG. 3B. As will be seen from FIGS. 1 and 2, if the value of resistor 32 is increased, a smaller portion of the signal supplied by cathode follower 28 will appear across resistor 34 and therefore a smaller portion of the total signal will be supplied to amplifier 38. If the taps 55 and 33 on variable resistors 50 and 32, respectively, are mechanically coupled to each other the maximum peak-to-peak variation of the output signal can be made to remain substantially constant as represented by the line 102 in FIG. 3B regardless of the setting of the clipping levels. This is illustrated by the following example. If resistor 50 is set to approximately 25% of full value, the amplitude range passed by the clippers will be as shown by arrow 104 in FIG. 3A.

Figure 4:
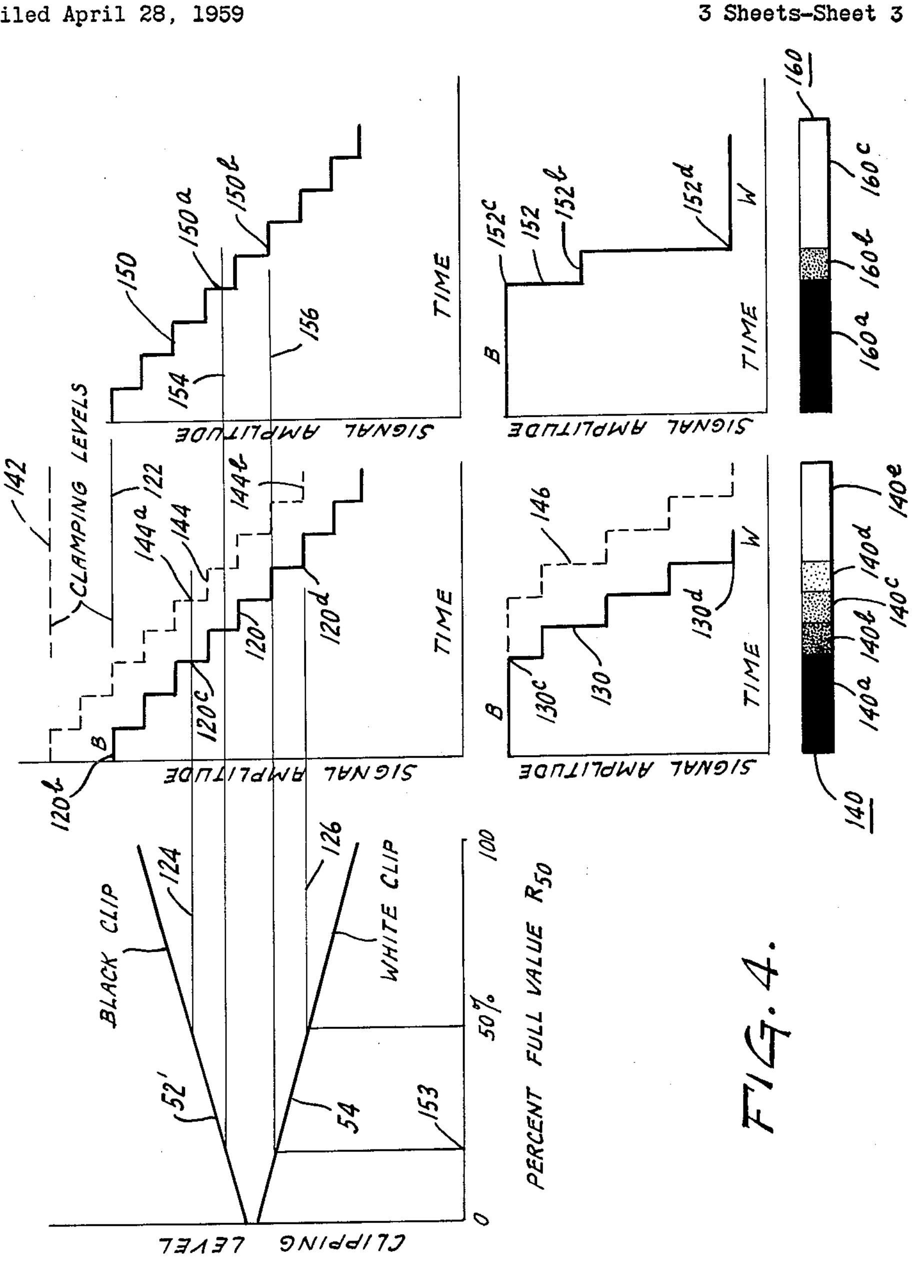
FIG. 4 is a series of related waveforms which illustrates the operation of the system of FIGS. 1 and 2.

The gain of the attenuator will be relatively high as shown by arrow 106. Therefore, the maximum peak-to-peak amplitude of the output signal will be as shown at 107 in FIG. 3B. If the value of resistor 50 is increased to approximately 75% of the full value, a larger amplitude range 108 will be passed by the clipping circuit. However, increasing the value of resistor 32 will reduce the gain of the attenuator 32–34 to the value represented by arrow 110. Therefore the over-all dynamic range of the system, that is, the maximum peak-to-peak amplitude of the output signal will be as shown at 111 in FIG. 3B which will again be approximately equal to that represented by point 107. A control knob associated with coupling 56 between the taps on resistors 50 and 32 therefore becomes a control of how much contrast enhancement is obtained in the output signal. As pointed out previously, changing the position of the tap 14 on potentiometer 16 changes the black level of the input signal with respect to the two clipping levels 52′ and 54′. Thus changing the position of tap 14 moves the time variable portion of the video signal up or down over the clipping range established by cathode followers 72 and 76. Therefore tap 14 determines where in the amplitude range of the input signal the particular incremental range 104 or 108 will be taken. The operation of these controls is further illustrated in FIGS. 4 and 5. Characteristic curves 52′ and 54′ of FIG. 4 correspond to similarly numbered curves in FIG. 3A. Curve 120 in FIG. 4 represents a video input signal which might be supplied to lead 10. A staircase waveform of this type would be generated if the object scanned comprised a series of parallel bars each of a different density or reflectivity and so arranged that successive bars shade uniformly from black to white. The black level $120^b$ of waveform 120 is clamped at level 122 by the keyed clamp circuit 12 of FIG. 1. If it is assumed that resistor 50 is set to 50 percent of its full value, the clipping levels will be as represented by the light lines 124 and 126. Therefore only the portion of waveform 120 lying between the points $120^c$ and $120^d$ will be passed by the double clipping circuit 22 to cathode follower 28. Waveform 130 in FIG. 4 is a time vs. amplitude plot of the signal supplied to the input of amplifier 38 by cathode follower 28 and attenuator 32–34. It will be noted that point $130^c$ on waveform 130 is in time coincidence with point $120^c$ on waveform 120. Similarly point $130^d$ is in time coincidence with point $120^d$ on waveform 120. It will be noted that there are the same number of steps between points $130^c$ and $130^d$ as there are between points $120^c$ and $120^d$. However the size of these steps in waveform 130 are greater than those in waveform 120. It should be noted also that all steps in waveform 120 occurring before point $130^c$ have been eliminated in waveform 130. Similarly the variations in the signal occurring after point $120^b$ have been eliminated in waveform 130. If the signal 130 is supplied to a cathode ray tube indicator, the line traced on the screen of the indicator by this video signal will be as shown at 140 in FIG. 4. The black region $140^a$ corresponding to the portion of signal 130 up to the point $130^c$ will be followed by three regions of gray $140^b$, $140^c$ and $140^d$. $140^b$ will be the darkest shade of gray, $140^c$ somewhat lighter and region $140^d$ still lighter. The portion of signal 130 following point $130^b$ will produce a white area on the screen as represented by area $140^e$.

If the clamping level is changed to a value such as 142 by shifting the position of tap 14 on potentiometer 16, waveform 120 will be shifted to a position such as shown in 144. Clipping levels 124 and 126 will remain the same but as seen in FIG. 4, a different portion of the waveform 144 is selected. In the example chosen for illustration the portion of waveform 144 between point $144^a$ and point $144^b$ is selected for amplification. A signal at the input of amplifier 38 will be as shown by the broken line 146 in FIG. 4. The visual indication appearing on the indicator screen would be the same as that shown at 140 in FIG. 4 except that the black bar $140^a$ would be longer and the white bar $140^e$ shorter. The gray bars $140^b$, $140^c$ and $140^d$ would be shifted to the right.

The effect of changing the value of the clipping levels without changing the clamping level is illustrated by waveforms 150 and 152 of FIG. 4. These waveforms are again signal amplitude vs. time plots of the input signal and output signal, respectively, of the circuit of FIG. 2. Waveform 150 corresponds exactly to waveform 120 of FIG. 4. If the value of resistor 50 is reduced to a value 153 so that the clipping levels are as shown at 154 and 156, respectively, only the variations in the waveform 150 occurring between points $150^a$ and $150^b$ will be passed on to cathode follower 28 and amplifier 38. Since the gain of the attenuator 32–34 is increased as the selected amplitude range of the double clipping circuit decreases, the steps in waveform 152 will be of larger amplitude than steps in waveform 130. However, the dynamic range from point $152^c$ to $152^d$ will be substantially the same as the dynamic range from point $130^c$ to point $130^d$ on waveform 130.

The signal 152 of FIG. 4 will produce a trace on a cathode ray tube as shown at 160. A portion of waveform 152 up to the point $152^c$ is at the black level and produces the black area $160^a$. The portion of waveform $152^b$ produces a gray band as shown at $160^b$ and the portion of waveform 152 beyond point $152^d$ produces the white area $160^c$.

FIG. 5 illustrates the operation of the circuit of FIGS. 1 and 2 when supplied with a video signal which might be obtained from scanning a selected line across a photographic negative such as an X-ray negative of the human body. The characteristic curves 52′ and 54′ showing the relationship between clipping level and percent full value of resistor 50 correspond to similarly numbered curves of FIGS. 3 and 4. It is assumed in FIG. 5 that resistor 50 is set to a vaue represented by the line 170 so that the clipping levels are as shown at 172 and 174. Waveform 176 of FIG. 5 is an amplitude vs. time plot video signal. This video signal has a black level which is clamped at a level above clipping level 172 and has peaks which extend below clipping level 174. The diagram 178 of FIG. 5 represents the appearance of one trace on the screen of a cathode ray tube which might result from the application of waveform 176 to the intensity control element of this tube. Portions of the signal above clipping level 172 will result only in black areas $178^b$ upon the screen. The peaks below level 174 will appear as white areas $178^c$ on the screen. The portions of the signal between clipping levels 172 and 174 will produce areas $178^d$ in varying shades of gray on the screen. Since waveform 178 is a continuous curve rather than a stepped curve, each of the areas $178^d$ will present a continuous range of gray tones. No attempt has been made to illustrate the shadings within each area $178^d$ of FIG. 5.

While the invention has been described with particular reference to indicator systems it can be seen from FIG. 4 that the amplitude difference in enhancement produced by the circuit is entirely independent of any utilization device employed in connection with the circuit. Similarly, the system shown in the drawing is independent of the origin of the signal and may be employed for selecting a particular amplitude range of any signal for amplification, signal processing or utilization. One preferred form of variable gain attenuator and bias level adjusting potentiometer have been shown in the drawing. However, other equivalent forms may be substituted therefor within the scope of the invention. In FIG. 2 the white clipper precedes the black clipper. This order may be reversed without altering the over-all operation of the circuit shown in this figure.

Therefore, while the invention has been described with reference to a single embodiment thereof, it will be apparent that various modifications and other embodiments thereof will occur to those skilled in the art within the scope of the invention. Accordingly I desire the scope of my invention to be limited only by the appended claims.

What is claimed is:

1. A system for amplifying a selected range of amplitude variations of an input signal comprising a source of adjustable bias potential, first control means coupled to said source for controlling the bias potential supplied by said source, signal combining means coupled to said source and including input signal receiving means for superimposing said input signal on the bias supplied by said source to provide a composite signal, circuit means comprising first and second adjustable clipper circuits and a variable gain circuit arranged in cascade in the order recited, second control means coupled to said first and second clipper circuits and said variable gain circuit and having one actuating means for simultaneously controlling the operation of said first and second clipper circuits and said variable gain circuit, said second control means causing the separation of the clipping levels of said first and second clipper circuits to vary in opposite sense as said second control means is adjusted by said one actuating means, the mean value between said clipping levels remaining substantially constant, said second control means further causing the gain of said variable gain circuit to vary in a sense opposite to the change in magnitude of the separation of said clipping levels, means coupling said signal combining means to the input of said circuit means for supplying said composite signal to the input of said circuit means and means associated with said circuit means for deriving an output signal from the output of said circuit means.

2. A system in accordance with claim 1 wherein the gain of said variable gain circuit varies by an amount such as to maintain a substantially constant peak-to-peak output signal amplitude from said circuit means as the setting of said second control means is varied.

3. A system for amplifying a selected range of amplitude variations of an input signal comprising a source of adjustable bias potential, first control means coupled to said source for controlling the bias potential supplied by said source, signal combining means coupled to said source and including input signal receiving means for superimposing said input signal on the bias supplied by said source to provide a composite signal, circuit means comprising first and second adjustable clipper circuits and a variable gain circuit arranged in cascade in the order recited, one of said clipper circuits being constructed and arranged to eliminate variations in amplitude of the signal supplied thereto which exceed a first selected amplitude level, the other of said clipper circuits being constructed and arranged to eliminate variations in amplitude of the signal supplied thereto which lie below a second selected amplitude level, second control means coupled to said first and second clipper circuits and said variable gain circuit and having one actuating means for simultaneously controlling the clipping levels of said first and second clipper circuits and the gain of said variable gain circuit, said second control means causing said first and second selected amplitude levels to vary in opposite sense as said second control means is adjusted by said one actuating means, the mean value of said first and second selected amplitude levels remaining substantially constant, said second control means further causing the gain of said variable gain circuit to vary in a sense opposite to the change in magnitude of the separation of said first and second selected amplitude levels, means coupling said signal combining means to the input of said circuit means for supplying said composite signal to the input of said circuit means and means associated with said circuit means for deriving an output signal from the output of said circuit means.

4. A system in accordance with claim 3 wherein the gain of said variable gain circuit is changed by an amount such as to maintain a substantially constant peak-to-peak output signal amplitude from said circuit means as the setting of said second control means is varied.

5. A system for amplifying a selected range of amplitude variations of an input signal comprising input signal receiving means including adjustable clamp means for clamping a selected point on said input signal at a selected potential, first control means coupled to said input signal receiving means for controlling the potential at which the input signal is clamped, circuit means comprising first and second adjustable clipper circuits and a variable gain circuit arranged in cascade in the order recited, second control means coupled to said first and second clipper circuits and said variable gain circuit and having one actuating means for simultaneously controlling the clipping level of said first and second clipper circuits and the gain of said variable gain circuit, said second control means causing the clipping levels of said first and second clipper circuits to vary in opposite sense as said second control means is adjusted by said one actuating means, the mean value between said clipping levels of said first and second clipper circuits remaining substantially constant, said second control means further causing the gain of said variable gain circuit to vary in a sense opposite to the change in magnitude of the separation of said clipping levels, means associated with said input signal receiving means and said circuit means for supplying the clamped input signal to the input of said circuit means and means for deriving an output signal from the output of said circuit means.

6. A system in accordance with claim 5 wherein the gain of said variable gain circuit is changed by an amount such as to maintain a substantially constant peak-to-peak output signal amplitude from said circuit means as the setting of said second control means is varied.

7. A system for amplifying a selected range of amplitude variations of an input signal comprising signal clamping means including input signal receiving means for clamping a time selected portion of said input signal at a selected potential level, first control means coupled to said signal clamping means for controlling the amplitude of said selected potential level, circuit means comprising first and second adjustable clipper circuits and a variable gain circuit arranged in cascade in the order recited, one of said clipper circuits being arranged to eliminate variations in amplitude of the signal supplied thereto which exceed a first selected amplitude level, the other of said clipper circuits being arranged to eliminate variations in amplitude of the signal supplied thereto which lie below a second selected amplitude level, second control means coupled to said first and second clipper circuits and said variable gain circuit and having one actuating means for simultaneously altering said first and second selected amplitude levels and the gain of said variable gain circuit, said second control means causing said first and second selected amplitude levels to change in opposite directions as said second control means is adjusted, the mean value between said first and second selected amplitude levels remaining substantially constant, said second control means further causing the gain of said variable gain circuit to vary in a sense opposite to the change in magnitude of the separation of said first and second amplitude levels and by an amount such as to maintain substantially constant the peak-to-peak amplitude of the output signal of said circuit means as the setting of said control means is varied, means associated with said signal clamping means for supplying the clamped input signal to the input of said circuit means and means for deriving an output signal from the output of said circuit means.

8. A system for amplifying a selected range of amplitude variations of an input signal comprising, input signal receiving means including input signal clamping means for clamping a time selected portion of said input signal at a selected potential, first control means coupled to said signal clamping means for controlling the amplitude of said selected potential, circuit means comprising a first biased diode clipper circuit, a second biased diode clipper circuit, and an adjustable signal ratio device, said two biased diode clipper circuits and said signal ratio device being arranged in cascade in the order recited, one of said biased diode clipper circuits being arranged to eliminate variations in signal amplitude supplied thereto which lie below a first selected amplitude level, the other of said biased diode clipper circuits being arranged to eliminate variations in signal amplitude which lie above a second selected amplitude level which is higher than said first selected amplitude level, second control means coupled to said circuit means and having one actuating means for simultaneously controlling the bias supplied to said first and second biased diode clipping circuits and the gain of said signal ratio device, said bias potentials being varied in a sense to cause said first and second selected amplitude levels to change in opposite sense as said second control means is adjusted by said one actuating means, the mean value between said first and second selected amplitude levels remaining substantially constant, said second control means further causing the gain of said signal ratio device to vary in the sense opposite to the change in magnitude of the separation of said first and second amplitude levels and by an amount such as to maintain substantially constant the peak-to-peak amplitude of the output signal of said circuit means as the setting of said second control means is varied by said one actuating means, means for supplying the clamped input signal supplied by said input signal receiving means to the input of said circuit means and means for deriving an output signal from the output of said circuit means.

9. A system for amplifying a selected range of amplitude variations of an input signal comprising a source of adjustable bias potential, first control means associated with said source for controlling the amplitude of the bias potential supplied by said source, input signal receiving means including clamping means coupled to said source for clamping a time selected portion of said input signal at the level of the bias potential supplied by said source thereby to control the average potential level of the clamped signal, circuit means comprising a first clipper circuit, a second clipper circuit and a signal ratio device connected in cascade in the order recited, each of said clipper circuits comprising a diode clipper element and a load impedance connected in series circuit and a cathode follower circuit for supplying a bias signal to one terminal of said series circuit, a second source of bias potential for supplying different bias potentials to the inputs of said cathode follower circuits in said first and second clipper circuits, respectively, second control means associated with circuit means and said second source and having one actuating means for simultaneously varying the bias supplied to said inputs of said cathode follower circuits and the gain of said signal ratio device, said bias supplied to said cathode follower circuits in said first and second clipper circuits being varied in a sense to cause the clipping levels of said first and second clipper circuits to vary in opposite sense as said second control means is adjusted by said one actuating means, the mean value between the clipping levels of said first and second clipper circuits remaining substantially constant, said second control means further causing the gain of said signal ratio device to vary in a sense opposite to the change in magnitude of the separation of said clipping levels of said first and second clipper circuits and by an amount such as to maintain substantially constant the peak-to-peak output signal amplitude of the signal from said circuit means as the setting of said second control means is varied by said one actuating means, means for supplying the clamped input signal supplied by said input signal receiving means to the input of said circuit means and means for deriving an output signal from the output of said signal ratio device.

References Cited by the Examiner

UNITED STATES PATENTS

| | | | |
|---|---|---|---|
| 2,502,568 | 4/50 | Hulsberg | 323—79 X |
| 2,709,716 | 5/55 | Haller | 250—27 |
| 2,724,738 | 11/55 | Babbs | 250—27 |
| 2,743,313 | 4/56 | Schwarz | 178—7.5 |
| 2,898,457 | 8/59 | Auerbach | 250—27 |
| 2,910,531 | 10/59 | Fathauer | 250—27 |
| 2,971,165 | 2/61 | Linn | 328—169 X |
| 2,999,127 | 9/61 | Fisher | 328—54 X |

ARTHUR GAUSS, *Primary Examiner.*

HARRY GAUSS, GEORGE N. WESTBY, *Examiners.*